United States Patent
Robertson et al.

(10) Patent No.: US 6,654,834 B1
(45) Date of Patent: Nov. 25, 2003

(54) METHOD AND APPARATUS FOR DATA TRANSFER EMPLOYING CLOSED LOOP OF MEMORY NODES

(75) Inventors: Iain Robertson, Bedfordshire (GB); John Keay, Bedford (GB); Amarjit S. Bhandal, Daventry (GB); Keith Balmer, Bedford (GB)

(73) Assignee: Texas Instruments Incorporated, Dallas, TX (US)

( * ) Notice: Subject to any disclaimer, the term of this patent is extended or adjusted under 35 U.S.C. 154(b) by 445 days.

(21) Appl. No.: 09/615,645

(22) Filed: Jul. 13, 2000

(30) Foreign Application Priority Data

Jul. 16, 1999 (GB) ............................................. 9916705

(51) Int. Cl.[7] .............................................. G06F 1/00
(52) U.S. Cl. ...................... 710/107; 710/111; 709/216
(58) Field of Search ................................. 710/107, 110, 710/111, 113, 118, 312, 241, 31, 32, 33, 37–38, 60–61, 220, 240, 243; 709/208, 209, 211, 217, 238, 242, 216; 711/149, 150, 154, 169; 370/476, 477, 492

(56) References Cited

U.S. PATENT DOCUMENTS

| | | | |
|---|---|---|---|
| 4,071,706 A | | 1/1978 | Warren .......................... 179/15 |
| 4,573,120 A | | 2/1986 | Ichimiya et al. ............. 364/200 |
| 4,630,233 A | | 12/1986 | Weppler ...................... 364/900 |
| 4,703,451 A | | 10/1987 | Calabrese ................... 364/900 |
| 4,814,761 A | | 3/1989 | Takahashi et al. ...... 340/825.05 |
| 5,287,353 A | * | 2/1994 | Buda et al. ................. 370/85.5 |
| 5,357,621 A | * | 10/1994 | Cox ............................ 711/172 |
| 5,721,737 A | * | 2/1998 | Radjabi et al. .............. 370/449 |
| 5,734,926 A | * | 3/1998 | Feeley et al. .................. 710/28 |
| 5,802,321 A | * | 9/1998 | Buda et al. .................. 709/200 |
| 5,948,089 A | * | 9/1999 | Wingard et al. ............. 710/107 |
| 6,073,233 A | * | 6/2000 | Chapman ........................ 713/1 |
| 6,401,167 B1 | * | 6/2002 | Barth et al. ................. 711/106 |

FOREIGN PATENT DOCUMENTS

| | | | |
|---|---|---|---|
| GB | 2 234 372 A | 1/1991 | |
| WO | WO 93/13484 | 7/1993 | ........... G06F/13/37 |
| WO | WO 93/13607 | 7/1993 | ............. H04J/3/02 |

* cited by examiner

Primary Examiner—Paul R. Myers
Assistant Examiner—Raymond N Phan
(74) Attorney, Agent, or Firm—Robert D. Marshall, Jr.; W. James Brady, III; Frederick J. Telecky, Jr.

(57) ABSTRACT

Data transfer between a master node (300) and plural memory nodes (301–308) follows a synchronous fixed latency loop bus (255). Each memory node includes bus interface (311–318) which passes command, write data, address and read data to a next memory node in the loop. Each memory node performs a read from its memory at the specified address if a read command is directed to it. Each memory node performs a write to its memory at the specified address if a write command is directed to it. This configuration provides a fixed latency between the issue of a read command and the return of the read data no matter which memory node is accessed. This configuration prevents collision of returning read data. This configuration retains the issued read and write order preserving proper function for read/write and write/read command pairs. This configuration provides fixed loading to each stage regardless of the number of memory nodes. Thus the design of large systems operating at high speeds is simplified.

46 Claims, 5 Drawing Sheets

METHOD AND APPARATUS FOR DATA TRANSFER EMPLOYING CLOSED LOOP OF MEMORY NODES

TECHNICAL FIELD OF THE INVENTION

The technical field of this invention is microprocessors and digital signal processor performing data exchange between memory ports of a multiple port device.

BACKGROUND OF THE INVENTION

The present invention deals with the data transfer connecting various memory port nodes as applied to the transfer controller with hub and ports architecture. The transfer controller with hub and ports is the subject of U.K. Patent Application serial number 9909196.6 filed Apr. 21, 1999 having a U.S. convention application Ser. No. 09/543,870 filed Apr. 6, 2000 now U.S. Pat. No. 6,496,740 entitled TRANSFER CONTROLLER WITH HUB AND PORTS ARCHITECTURE. The transfer controller with hub and ports is a significant basic improvement in data transfer techniques in complex digital systems and provides many useful features, one of which is the internal memory port which allows connection of a virtually unlimited number of processor/memory nodes to a centralized transfer controller. The centralized transfer controller must be able to transfer data from node to node with performance relatively independent of how near or remote a node might be from the transfer controller itself. To clarify the problem solved by the present invention, it is helpful to review the characteristics, architecture, and functional building blocks of the transfer controller with hub and ports.

While direct memory access (DMA) techniques are a powerful tool in a digital signal processor system, they have their limitations. The fundamental limitation of a conventional direct memory access engine is that adding additional channel capacity requires additional hardware (in general, a replication of a complete channel). Some optimizations can be made in this area, such as sharing registers between multiple channels, but in general, the following rule holds: N-channels costs N times as much as a single channel.

Conventional direct memory access techniques read from a source, and subsequently pass the data on to a destination. The source transfers will initially proceed at full rate. However, if the source has higher data transfer bandwidth than the destination, this data will backlog within the direct memory access engine. This will eventually slow the rate at which source transfers are issued. Thus the source data transfer bandwidth is effectively restricted to that of the destination. If another channel has a different source port and a different destination port, there are no conflicts using the conventional read driven approach. However, if the source port of the other channel is the same, the other channel could not be processed. This makes for inefficiency. In a device that supports only one transfer at a time, this is acceptable. However, the transfer controller with hub and ports device supports multiple concurrent transfers and other provisions must be made. A normal transfer process in the known art starts by reading data from the source and then writing it to the destination. The source read drives the process in that it occurs first, and everything follows as a consequence.

With a conventional read driven approach, the source will start reading data which will be passed to the destination. However, if the destination is slow, a backlog of data waiting to be written will eventually cause the source read process to stall because it will not have anywhere to put the data read. With only one channel this is acceptable, but if there are multiple channels, conflicts occur. The source for this channel is stalled and cannot respond to more read requests. However, it is desirable to be able to service a different channel instead.

These basic limitations to conventional data transfer techniques led to the initial development of the transfer controller with hub and ports. The transfer controller with hub and ports is a unique mechanism which consolidates the functions of a direct memory access and other data movement engines in a digital signal processor system (for example, cache controllers) into a single module.

Consolidation of such functions has both advantages and disadvantages. The most important advantage of consolidation is that it will, in general, save hardware since multiple instantiations of the same type of address generation hardware will not have to be implemented.

On a higher level, it is also advantageous to consolidate address generation since it inherently makes the design simpler to modify from a memory-map point of view. For example, if a peripheral is added or removed from the system, a consolidated module will be the only portion of the design requiring change. In a distributed address system (multi-channel direct memory access for example), all instances of the direct memory access channels would change, as would the digital signal processor memory controllers.

Fundamental disadvantages of the consolidated model, however, are its inherent bottle necking, resulting from conflicting multiple requests, and its challenge to higher clock rates. Additionally, there is in general an added complexity associated with moving to a consolidated address model, just because the single module is larger than any of the individual parts it replaces.

The transfer controller with hub and ports, to which this invention relates, is a highly parallel and highly pipelined memory transaction processor. This transfer controller with hub and ports serves as a backplane to which many peripheral and/or memory ports may be attached.

SUMMARY OF THE INVENTION

This invention allows for the connection of the multiple memory port nodes of multi-processor devices to be connected in a manner which preserves read latency irrespective of how near or remote a node may be from a centralized data transfer controller such as the transfer controller with hub and ports architecture upon which it is based. Using this manner of connection, referred to as "synchronous fixed latency loop", the issue of a read command and retrieval of data at the memory port requesting the data transfer requires a fixed number of clock cycles for any memory port on the data transfer bus. This allows for more straightforward implementation of the read-then-write operations which makes up the data transfer process.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
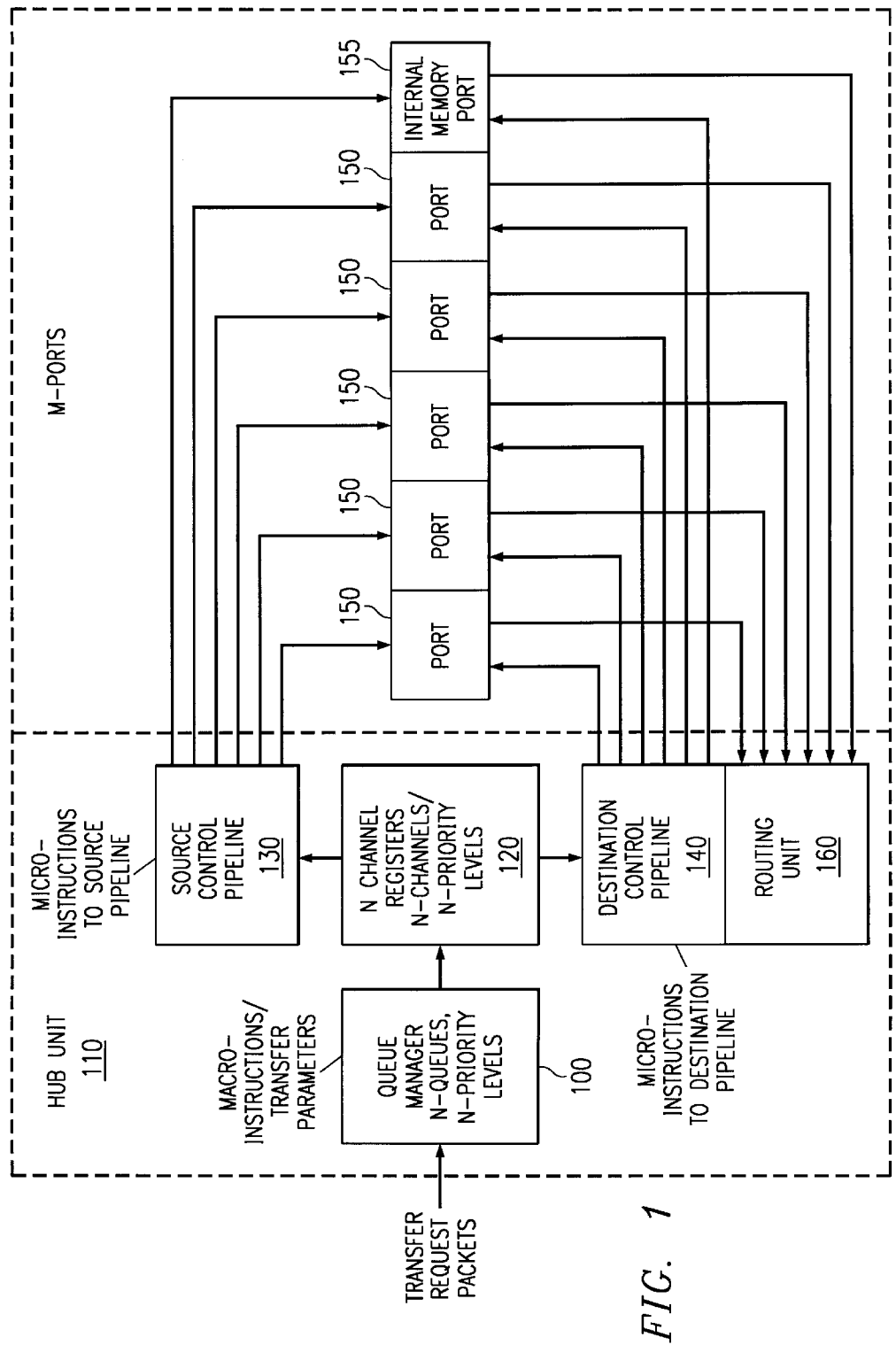
FIG. 1 illustrates a block diagram of the basic principal features of a transfer controller with hub and ports architecture transfer controller with hub and ports.

FIG. 1 illustrates a block diagram of the basic features of the transfer controller with hub and ports. The transfer controller with hub and ports is basically a data transfer controller which has at its front end portion, a queue manager 100 receiving, prioritizing, and dispatching data in the form of transfer request packets. This queue manager 100 connects within the hub unit 110 to the channel registers 120. Channel registers 12 receives the data transfer request packets and processes them first by prioritizing them and assigning them to one of the N channels. Each channel represents a priority level. These channel registers 120 interface with the source control pipeline 130 and destination control pipeline 140. These are address calculation units for source (read) and destination (write) operations.

Outputs from these pipelines are broadcast to M Ports (six shown in FIG. 1 as 150 through 155). The ports 150 to 155 are clocked either at the main processor clock frequency or at a lower external device clock frequency. Read data from one port, e.g. port 150, having a destination write address of port 153 is returned to the hub destination control pipeline through the routing unit.

The transfer controller with hub and ports, to which this invention relates, introduces several new ideas supplanting the previous transfer controller technology. First, it is uniformly pipelined. In the previous transfer controller designs, the pipeline was heavily coupled to the external memory type supported by the device. In the preferred embodiment, the transfer controller with hub and ports contains multiple external ports, all of which look identical to the hub. Thus peripherals and memory may be freely interchanged without affecting the transfer controller with hub and ports. Secondly, the transfer controller with hub and ports concurrently executes transfers. That is, up to N transfers may occur in parallel on the multiple ports of the device, where N is the number of channels in the transfer controller with hub and ports core. Each channel in the transfer controller with hub and ports core is functionally just a set of registers. These registers track the current source and destination addresses, the word counts and other parameters for the transfer. Each channel is identical, and thus the number of channels supported by the transfer controller with hub and ports is highly scalable. Thirdly, the transfer controller with hub and ports includes a mechanism for queuing transfers up in a dedicated queue RAM.

Figure 2:
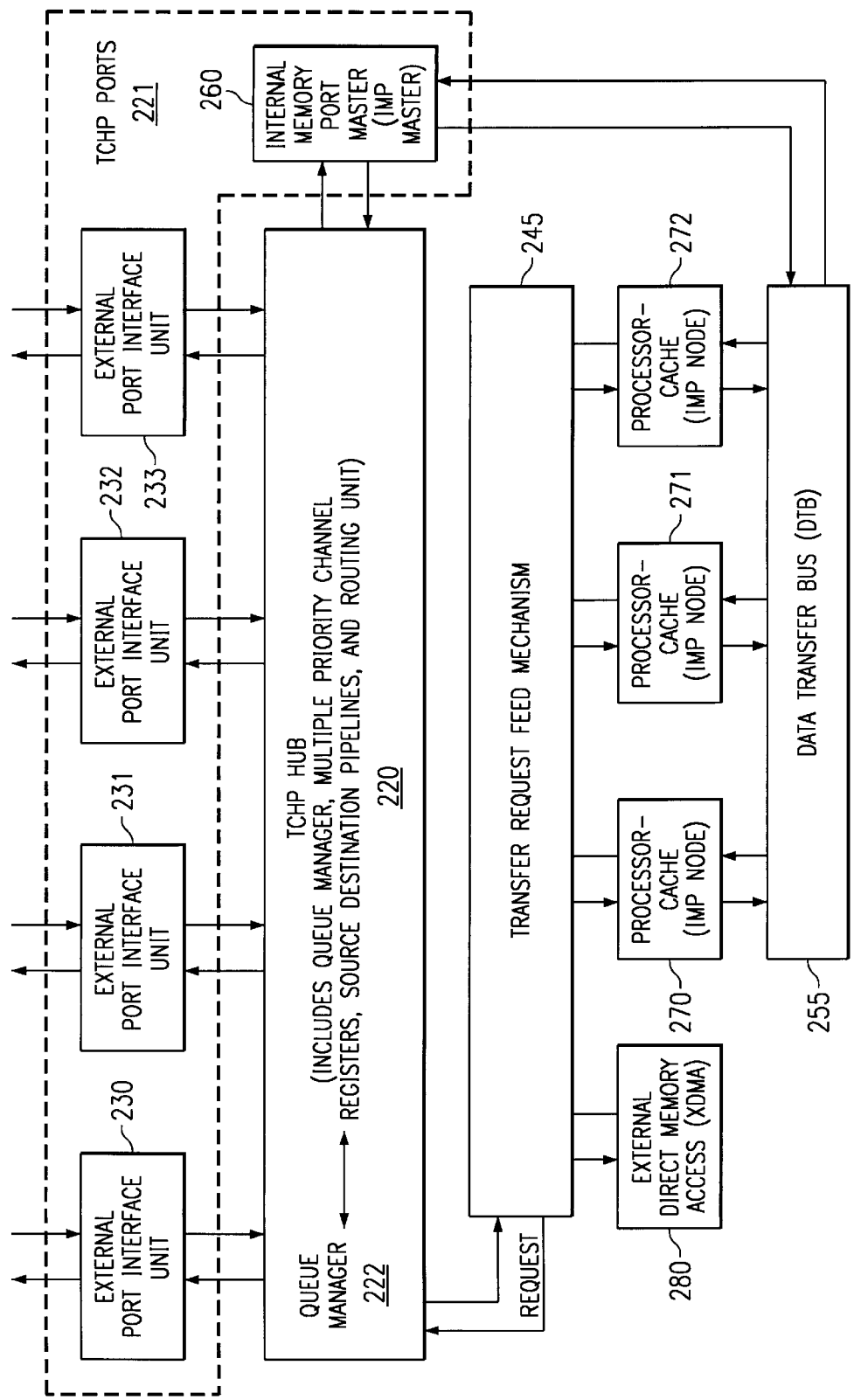
FIG. 2 illustrates the multi-processor machine with transfer controller with hub and ports architecture functional block relating to this invention, showing from a higher level, the essential elements of the transfer controller with hub and ports and its associated functional units.

FIG. 2 illustrates from a higher level an overview of a multiprocessor integrated circuit employing the transfer controller with hub and ports of this invention. There are four main functional blocks. The transfer controller with hub and ports hub 220 and the ports 221 including ports external port interface units 230 to 233 and internal memory port 260 are the first two main functional blocks. Though four external port interface units 230, 231, 232 and 233 are illustrated, this is an example only and more or less could be employed. The other two main functional blocks are the transfer request feed mechanism 245 and the data transfer bus (DTB) 255. These are closely associated functional units that are but not a part of the transfer controller with hub and ports 220. Transfer request feed mechanism 245 is coupled to plural internal memory port nodes 270, 271 and 272. Though three internal port nodes 270, 271 and 272 are illustrated, this is an example only and more or less could be employed. Each of these internal memory port nodes preferably includes an independently programmable data processor, which may be a digital signal processor, and corresponding cache memory or other local memory. The internal construction of these internal memory port nodes 270, 271 and 272 is not important for this invention. For the purpose of this invention it sufficient that each of the internal memory port nodes 270, 271 and 272 can submit transfer requests via transfer request feed mechanism 245 and has memory that can be a source or destination for data. Transfer request feed mechanism 245 prioritizes these packet transfer requests in a manner not relevant to this invention. Transfers originating from or destined for internal memory port nodes 270, 271 or 272 are coupled to transfer controller with hub and ports 220 via data transfer bus 255 and internal memory port master 260. FIG. 2 highlights the possible connection of data transfer bus 255 to multiple internal memory port nodes 270, 271 and 272 and the possible connection of multiple transfer request nodes to transfer request feed mechanism 245.

Figure 3:
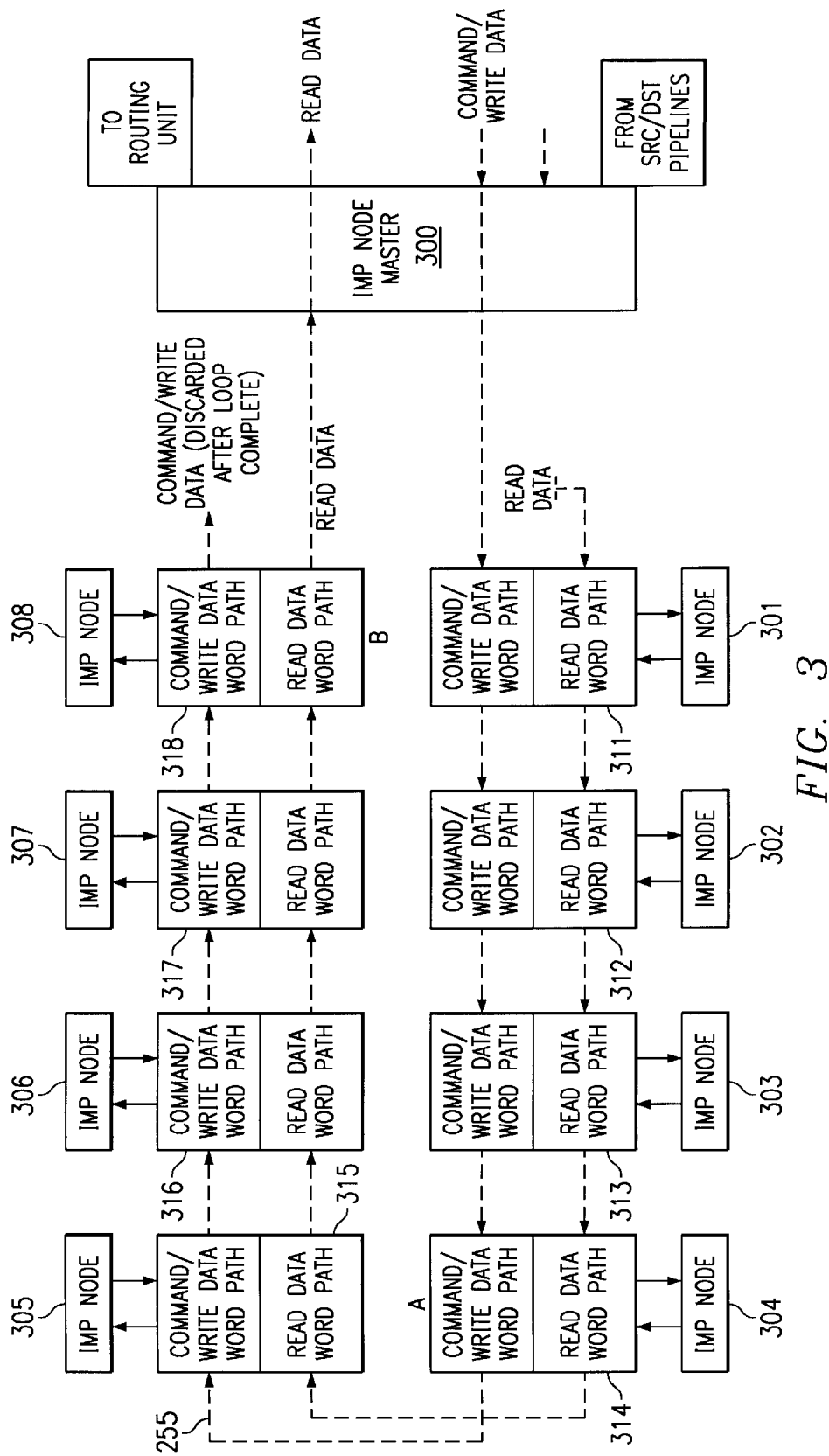
FIG. 3 illustrates the functional block diagram of the synchronous fixed latency loop data bus of this invention.

FIG. 3 illustrates an example of the synchronous fixed latency loop of this invention. FIG. 3 illustrates further details of data transfer bus 255. This fixed latency loop includes of multiple synchronous internal memory port nodes 301 to 308, which correspond to internal memory port nodes 270, 271 and 272. Each internal memory port node 301 to 301 includes a corresponding data transfer bus interface 311 to 318. Both commands and data are latched at data transfer bus interfaces 311 to 318. To read data from memory at a particular internal memory port node 301 to 308, a read command must first pass from the internal memory port node master 300 through some number of nodes in the loop until the required internal memory port node is reached. Once accessed, read data is passed back to controller through the remaining nodes back to internal memory port node master 300. The nature of the loop is such that for all memory devices on the loop, the sum of the number of nodes through which the read command passes plus the number of nodes through which the read data passes is a constant. This constant corresponds to the length of the loop.

The synchronous fixed latency loop bus is divided into two paths of equal number of registers and equal latency. The first path transports a "command/write data" word. The second path transports a "read data" word. Separate unidirectional data buses for read and write are used. Depending on where in the loop an internal memory port node is, there will be differing numbers of command/write data delay stages and read data delay stages. However, but the sum of the two will always be constant related to the number of nodes in the loop. Thus read data returns at a pre-determined number of clock cycles after it is requested. Additionally, placing the internal memory port nodes 301 to 308 in a loop prevents conflicts if multiple memory nodes want to drive the bus simultaneously. If all the internal memory port nodes had a dedicated read data bus, there is the possibility that the data from many reads may arrive at internal node master 300 simultaneously. Handling this possibility would add complexity to the bus controller. Within the loop of FIG. 3, all such conflicts are avoided.

Conventionally, a memory interface has a single address bus connected to all the devices accessed. Conventional memory interfaces have either a single bidirectional read/write data bus or independent unidirectional read and write data buses. When the clock speed is high, the number of devices large or the wire lengths are long, in any combination, coordination and control of such a system starts to break down due to inherent wiring delays.

The synchronous fixed latency loop data bus of this invention addresses this problem. Address and write data signals are passed from device to device in a daisy chain fashion, buffered through registers at each device. Thus, the loading on the connections is small and is independent of the number of devices. This allows the clock speed and the number of devices to be increased. A characteristic of this system is that address information and write data take longer to reach nodes farther from the internal memory port master node. This is not a problem for writes. However, if read data were simply passed back to the internal memory port node master 300 through the loop of registers, the read latency (time between the internal memory port node master issuing the read address, and the data being returned) would vary according to how far the device was from the internal memory port. This is unacceptable.

To solve this, the read data route continues along the loop in the same direction taken by the address signals. This eventually returns to internal memory port node master 300 at the end of the loop. The number of links in the loop from the read address issue to data return is constant producing a constant real latency. The first device to receive the address will have the most delay stages in its read data return path, whereas the last device to receive the address will have the least delay stages in its read return path. The sum of the number of address delay stages plus the number of read data delay stages will be the same for all devices. This sum corresponds to the length of the loop. This means that the read latency will be a constant for all internal memory port nodes. This read latency depends upon the absolute number of devices. It is easy to adjust for this read latency in the internal memory port processor.

On each clock cycle internal memory port node master 300 may issue either a read command or a write command, but not both. A read command requests a particular internal memory node 301 to 308 to return the data stored at a specified address. A write command requests a particular internal memory node 301 to 308 to store the write data at a specified address. Some manner of distinguishing between the internal memory port nodes 301 to 308 for reads and writes is assumed. In addition, each internal memory port node 301 to 308 is assumed to include a quantity of addressable memory. These objectives could be achieved by assigning a node number to each internal memory port node 301 to 308. The memory of each internal memory port node 301 to 308 would be addressable by a supplied address, which could include separate address spaces. Alternatively, each internal memory port node 301 to 308 could be assigned a subset of a unified address space. The intended internal memory port node is determined based upon which subset of memory is addressed. In the preferred embodiment each internal memory port node 301 to 308 consists of a digital signal processor core and corresponding instruction cache memory and data cache memory/random access memory. Each such digital signal processor preferably includes the same amount of memory and the node is determined by the high order bits of the memory address.

In the preferred embodiment each read command or write command consists of two words. These two words are a "command write data" word and a "read data" word. As illustrated in FIG. 3, these two words are routed on different paths in the loop of internal memory port nodes 301 to 308. In the preferred embodiment, these two words have the following bit-by-bit makeup. The "command/write data" word includes 100 bits employed as noted below:

Bit 99 STATUS—When asserted this bit implies the write command is a read command exception and not a normal data write.

Bit 98 RD/READ—When asserted this bit indicates the command is a read data command.

Bit 97 WR/WRITE—When asserted this bit indicates the command is a write data command. Note only one of the RD bit or the WR may be active in any one command.

Bit 96 SP/SEMAPHORE—When asserted this bit indicates that the current data transfer is a semaphore transfer. In a manner not relevant to this invention, semaphore transfers are used to indivisibly swap contents between a source address and a destination address Bits 95-32 WRITE DATA—This field holds the data to be written in the command is a write data command. This field holds no data for a read data command.

Bits 31-2 ADDRESS—This field holds the read or write address. The address field is the upper 29 bits of a 32 bit address. All transfers employing data transfer bus 255 are of 64 bits, thus the lower 3 bits of the byte address are assumed to be "000" (aligned to double word boundaries). If less than 64 bits are to be transferred transfer controller with hub and ports 220 produces that proper data alignment in a read-modify-write cycle.

Bits 1-0 These bits are reserved for indicating high and low word valid and are not relevant to this invention.

The second word is the "read data" word. The "read data" word includes about 64 bits. All 64 bits of the "read data" word are dedicated to read data. This word contains read data only after a read has been performed during the progression of these two words through the synchronous fixed latency loop. On a write operation these bits contain no information. As shown in FIG. 3, the read data input to data transfer bus interface 311 receives data from a fixed source.

Figure 4:
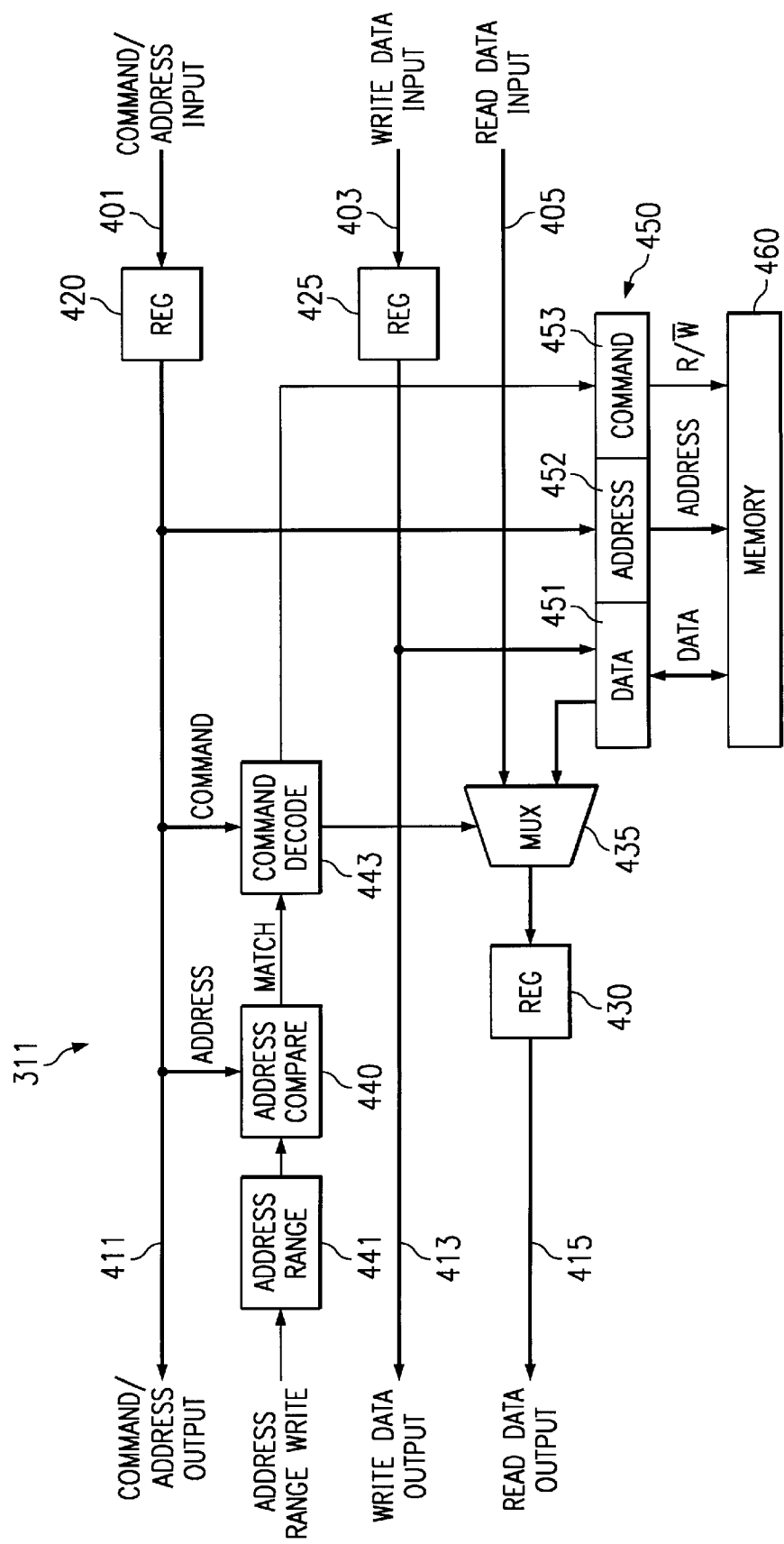
FIG. 4 is a more detailed block diagram of the data transfer bus interface of each internal memory port node illustrated in FIG. 3.

FIG. 4 illustrates the structure of data transfer bus interface 311. The data transfer bus interfaces 311, 312, 313, 314, 315, 316, 317 and 318 are preferably identical. Data transfer bus interface 311 includes three inputs. Command/address input 401 receives the command and address part of the command/write data word from the prior data transfer bus interface in the loop. In the case of the first data transfer bus interface, such as data transfer bus interface 311, this input comes from internal memory port node master 300. The command/address word is latched into register 420 for one clock cycle. On the next clock cycle the command/address word is output from data transfer bus interface via command/address output 411. This output is connected to the command/write data input of the next data transfer bus interface in the loop. In the case of the last data transfer bus interface in the loop, such as data transfer bus interface 318, the command/address word is discarded. The write data is received on write data input 403 and similarly latched in register 425. The next clock cycle this write data is supplied to the next data transfer bus interface on write data output 413. Note that FIG. 3 illustrates the command/address word and the write data word on a single line. The separate bits of the command/write data word of FIG. 3 have been separately illustrated in FIG. 4 for clarity.

The read data word is received on read data input 405. This read data word is latched into register 430 for one clock cycle. The data transfer bus interface 311 outputs a read data word each cycle on read data output 415. Depending upon the status of the data transfer bus interface 311, the read data output could be the read data last received on read data input 405 or data recalled from the corresponding memory as selected by multiplexer 435.

Address comparator 440 is responsive to the address portion of the received command/address word. In conjunction with address range block 441, address comparator 440 determines if the just received command/address word requires action by the data transfer bus interface. In the preferred embodiment, each internal memory port node 301 to 308 is assigned a distinct subset of a unified address range. This subset address range is preferably fixed upon manufacture. Address range block 441 defines the address space subset of each internal memory port node by specifying the most significant bits of the address. The least significant bits of the address define an address location within the local memory 460 of that internal memory port node. This is logically equivalent to parsing the address into a node number and a local address. Alternatively, address range block 441 could specify an address range by one or more upper and lower address bounds. Address comparator 440 would determine if the received address falls within an address range defined by a corresponding pair of upper and lower address bounds. The address bounds defined by address range block 441 could be permanently set upon manufacture. This could be done by mask programming a register, by a laser-programmed register or by a fuse or antifuse programmed register as known in the prior art. Alternatively, the address bounds could be writeable during operation using control register writes. The addresses of these control registers must have some known, fixed state upon initialization. Regardless of the manner of specifying the node address range, address comparator 440 generates a match signal upon detection of a match between the received address and the corresponding node address range. This match signal will be active when the just received command/address word requires action from the current internal memory port node.

The match signal from address comparator 440 supplies an enable input of a decoder 443. Decoder 443 is responsive to the command portions of the received command/address word. These portions, such as the "RD" and "WR" bits described above, determine the action to be taken by the data transfer bus interface. Decoder 443 controls the action taken by data transfer bus interface 311 by control of multiplexer 435 and the command portion 453 of a memory bus interface 450. If address comparator 440 does not generate the match signal, then decoder 443 controls multiplexer 435 to select the read data received on read data input 405 for storage in register 430. Decoder 443 controls command portion 453 of memory bus interface 450 to be idle.

If address comparator 440 generates a match signal and decoder 443 detects a read operation, then decoder 443 controls a read operation. Decoder 443 controls the command portion 453 of memory bus interface 450 to perform a read operation. This could, for example, be done by causing output of a R/W signal from command portion 453 of memory bus interface 450 to memory 460 to indicate a read. Lastly, decoder 445 controls multiplexer 435 to select the output from the data portion 451 of memory bus interface 450 for storage in register 430. Once stored in register 430, the just read data will be supplied to the next data transfer bus interface via read data output 415 on the next clock cycle.

Lastly, if address comparator 440 detects a match and decoder 443 determines that the just received command/address word is a write operation into the memory at that node, the decoder 443 controls a write operation. In this case decoder 443 controls multiplexer 435 to store register 430 the just received read data on read data input 405. This stored read data will be output on read data output 415 the next clock cycle. Decoder 443 controls command portion 453 of memory bus interface 450 to indicate a write operation. Accordingly, the write data of the received write data word is written into memory 460 via data portion 451 of memory bus interface 450 at the address indicated in the just received command/address word stored in register 420. A summary of the operation of the data transfer bus interface 311 is shown below in Table 1.

TABLE 1

| Address Comparator 440 | Decoder 443 | Mux 435 | Command Portion 453 |
|---|---|---|---|
| no Match | — | Read Data Input 405 | Idle |
| Match | Read | Data Portion 451 | Read |
| Match | Write | Read Data Input 405 | Write |

In summary the synchronous fixed latency loop operates as follows. When internal memory node master 300 issues a command to data transfer bus 255, the command flows around the entire loop, one internal memory port node per cycle. Each internal memory port node checks the address of each command to see if the command is in within its address range. If the address is outside the address range of the internal memory port node, then the internal memory port node ignores the command. If the address is within the address range of the internal memory port node, then the node performs the command. If this command is a read, the internal memory port node supplies the read data to the next node in the loop. The read data will then flow around the read path of the loop of data transfer bus 255 until it reaches internal memory port node master 300. If this command is a write, the internal memory port node writes the received write data into a memory location of the memory corresponding to the received address.

Referring back to FIG. 3, the following example illustrates the read command and read data latency parameters in the synchronous fixed latency loop bus. This example involves transfer of data from internal memory port node 304 (labeled A in FIG. 3) to internal memory port node 308 (labeled B in FIG. 3).

At Clock 0, transfer controller with hub and ports 220 passes a "command/write data" word and a "read data" word to internal memory port node master 300. In the "command/write data" word "RD" bit is active indicating a read command. The write data field of the "command/write data" word and the read data field of the "read data" word contain no information. FIG. 3 illustrates that the initial read data supplied to the read data word input of internal memory port node 301 comes from a fixed source. This could be all 1's or all 0's The address field of the "command/write data" word contains an address within internal memory port node 304.

At Read Clock 1, internal memory port node master 300 supplied the "command/write data" word to data transfer bus interface 311 of internal memory port node 301. The "read data" word, which contains no data, is supplied to the read data input of data transfer bus interface 311 by a constant source illustrated in FIG. 3. As previously described this constant source could be all 1's or all 0's.

At Read Clock 2, Clock 3, and Clock 4 the two words pass from data transfer bus interface 311 to data transfer bus interface 314 via data transfer bus interfaces 312 and 313. At Clock 4, data transfer bus interface 314 detects a match between the address field of the command/write data word. This indicates the command is directed to this node. The operation is decoded as a read operation. Data transfer bus interface 314 passes the read command and the received address to internal memory port node 304. The data is recalled from the addressed location of the memory and loaded into data portion 461 of memory bus interface 460. This data will be supplied to data transfer bus interface 315 on Clock 5. Thus in this example the read command latency 4 clocks.

At Read Clock 5, Clock 6, Clock 7, and Clock 8 the command/write data word and the read data word are passed via data transfer bus 255 to data transfer bus interfaces 315, 316, 317 and 318. The command/write data word is unchanged and the read data word includes the data recalled from internal memory port node 304.

At Read Clock 9, the command/write data word is discarded. The read access is complete and the command/write data word is no longer needed. The read data word is passed to internal memory port node master 300. In this example the read data latency is 5 clocks. The total of the read command latency and the read data latency is 9 clocks.

At Read Clock 10 through Clock 10+N the read data is passed from internal memory port node master 300 to routing unit 160 in transfer controller with hub and ports 220. Routing unit 160 transfers the read data back to internal memory port 155 with the destination address. In this example the destination is within internal memory port node 308. The number of clocks used may vary if routing unit 160 must perform data alignment for the write or a read-modify-write cycle due to data alignment.

For the write cycle, routing unit 160 causes internal memory port node master 300 to form a command/write data word. This command/write data word includes write data corresponding to the data read from internal memory port node 304. The command/write data word has the bit "WR" active indicating a write operation. The address is the destination address in internal memory port node 308.

At Write Clock 1, internal memory port node master 300 passes the "command/write data" to data transfer bus interface 311 and "read data" from the constant source.

At Write Clock 2, Clock 3, Clock 4, Clock 5, Clock 6 and Clock 7 the two words are passed to successive data transfer bus nodes 312, 313, 314, 315, 316 and 317. The address matches none of the nodes and so the two words are unchanged.

At Write Clock 8, the two words reaches data transfer bus interface 318. Data transfer bus interface 318 detects a match to the address in the command/write data word. The write data is supplied to the internal memory to be written at the address.

At Write Clock 9, the command/write data words is discarded. The read data word, which does not include data, is passed back to internal memory port node master 300. The write latency from the issue of the write command to the return write command equals 9 clocks.

Table 2 lists the "read command" and "read data" latencies for each node of the configuration of FIG. 3. Table 2 also shows the total read latency of each data transfer bus node which is a constant 9 clocks in this circuit.

TABLE 2

Read Latency Table

| Data Transfer Node | Read Command Latency | Read Data Latency | Total Read Latency |
|---|---|---|---|
| 311 | 1 | 8 | 9 |
| 312 | 2 | 7 | 9 |
| 313 | 3 | 6 | 9 |
| 314 | 4 | 5 | 9 |
| 315 | 5 | 4 | 9 |
| 316 | 6 | 3 | 9 |
| 317 | 7 | 2 | 9 |
| 318 | 8 | 1 | 9 |

Figure 5:
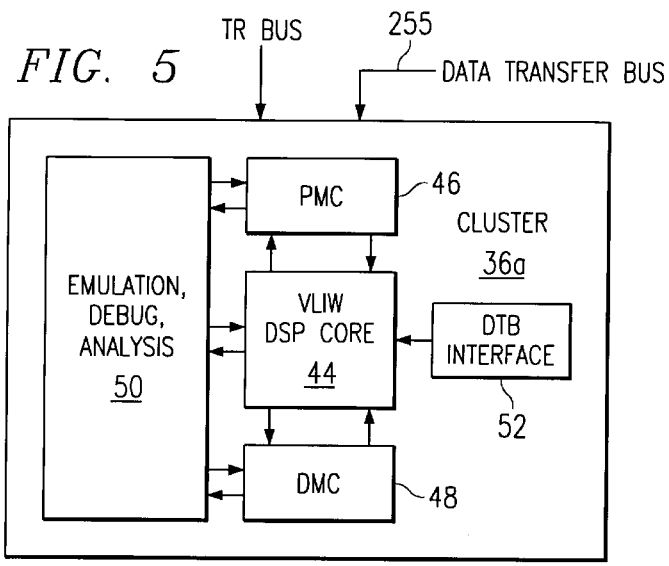
FIG. 5 illustrates a block diagram form an example of one of the multiple processors illustrated in FIGS. 2 and 3.

FIG. 5 illustrates a block diagram of an example of a preferred processor and cache memory combination implementing the internal memory nodes 270, 271 and 272 of FIG. 2 and 301 to 308 of FIG. 3. Each internal memory node 270, 271 and 272 preferably includes a digital signal processor core and corresponding instruction and data cache memory. Transfer controller with hub and ports 220 provides for all data communication among internal memory nodes 270, 271 and 272, external input/output (I/O) devices and peripherals at external ports 230 to 233, and internal memory at local memory port 260. Each internal memory node 270, 271 and 272 preferably comprises a very long instruction word (VLIW) digital signal processor core 44, program memory controller (PMC) 46, data memory controller (DMC) 48, an emulation, test, analysis and debug block 50, local memory and data transfer bus (DTB) interface 52. Internal memory nodes 270, 271 and 272 and transfer controller with hub and ports 220 communicate over a pair of high throughput buses. Transfer request feed mechanism 245 is used by digital signal processor cores 44 to specify and request transactions in transfer controller with hub and ports 220. Data transfer bus (DTB) 255 is used to load and store data from objects in the global memory map. While any given digital signal processor core 44 can access its own internal local memory within the cluster without permission from transfer controller with hub and ports 220, any access to global memory outside of its local memory requires a transfer controller directed data transfer, whether the access is to external memory or to another digital signal processor local memory. The overall architecture is scalable, allowing for the implementation of many internal memory nodes, although three is currently the preferred embodiment. It should be noted that architectural details, such as the number of digital signal processor cores, and their instruction set architectures are not essential to the invention. This microprocessor architecture is exemplary only, and the invention is applicable to many microprocessor architectures.

Figure 6:
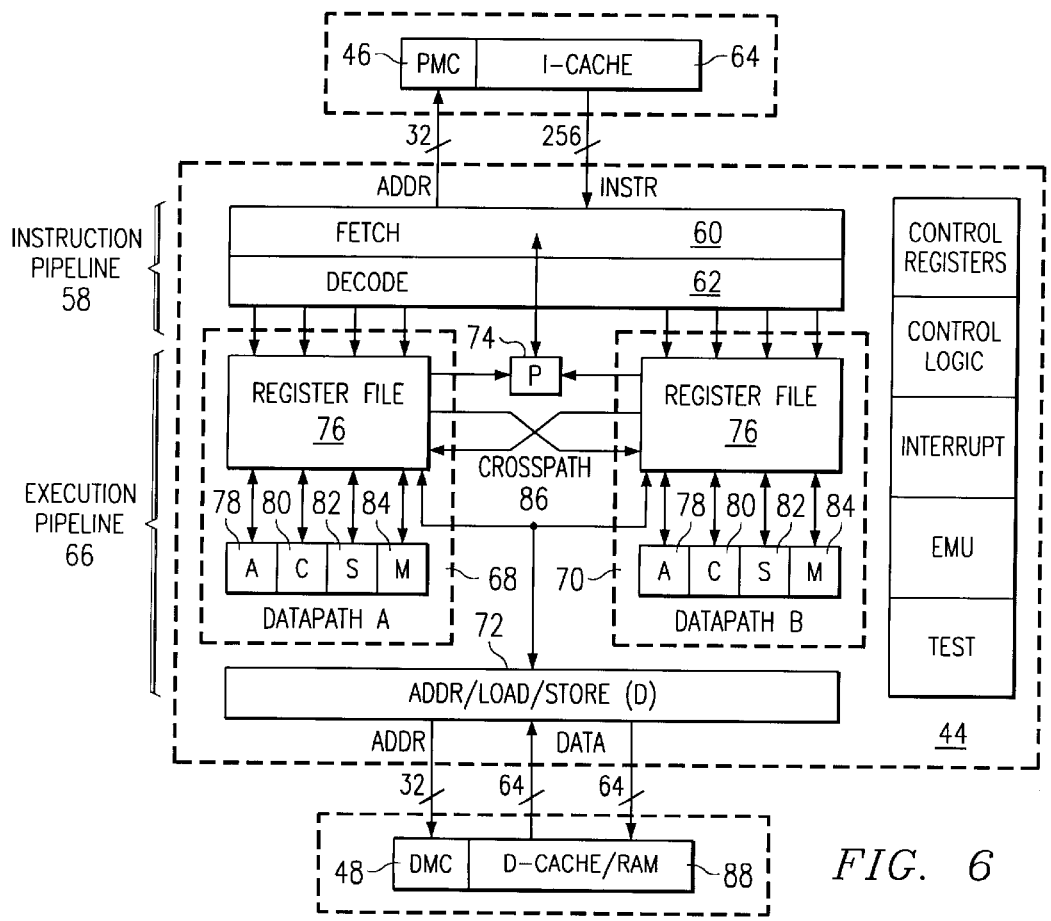
FIG. 6 illustrates further details of the very long instruction word digital signal processor core illustrated in FIG. 5.

FIG. 6 is a block diagram illustrating more detail of digital signal processor core 44 illustrated in FIG. 5. Digital signal processor core 44 is a 32-bit eight-way VLIW pipelined processor. The instruction set consists of fixed length 32-bit reduced instruction set computer (RISC) type instructions that are tuned for digital signal processing applications. Almost all instructions perform register-to-register operations and all memory accesses are performed using explicit load/store instructions. As shown in FIG. 6, instruction pipeline 58 consists of fetch stage 60 and decode stage 62. Fetch stage 60 retrieves program codes into the processor core from instruction cache 64 under control of program memory controller 46 in groups of eight instructions called a fetch packet. Decode stage 62 parses the fetch packet, determines parallelism and resource availability and constructs an execute packet of up to eight instructions. Each instruction in the execute packet is then translated into control signals to drive the appropriate units in execution pipeline 66. Execution pipeline 66 consists of two symmetrical datapaths, datapath A 68 and datapath B 70, a common 64-bit load/store unit group D-unit group 72, and a common branch unit group P-unit group 74. Each datapath contains 32-word register file (RF) 76, and four execution unit groups, A-unit group 78, C-unit group 80, S-unit group 82, and M-unit group 84. Overall there are ten separate unit groups in execution pipeline 66. Eight of these units may be scheduled concurrently every cycle. Each functional unit group contains plural functional units, some of which are duplicated between unit groups. In total there are nine 32-bit adders, four 32-bit shifters, three boolean operators, and two 32 bit by 16 bit multipliers. The multipliers are each configurable into two 16 bit by 16 bit multipliers or into four 8 bit by 8 bit multipliers. The memory at internal memory nodes 270, 271 and 272 is preferably partitioned between instruction cache memory 64 controlled via program memory controller 46 and data cache memory and random access memory 88 controlled via data memory controller 48. These memory partitions are employed by digital signal processor core 44 in a conventional manner.

Each digital signal processor core 44 may request data transfers in is several ways. Digital signal processor core 44 may issue a data transfer request to transfer controller with hub and ports 220 in response to an explicit data transfer instruction. The data transfer instruction must specify the data source, the data destination and the data amount. These specifications may be by immediate fields in the instructions or by parameters stored in registers or memory. It is preferable that each digital signal processor core 44 be capable of requesting any data transfer that can be serviced by transfer controller with hub and ports 220. Thus any digital signal processor core 44 may transfer data internally or externally and load or read any internal memory node.

Each digital processor core 44 preferably also includes automatic mechanisms for generating requests for data transfer for cache service. Thus an instruction cache miss preferably causes program memory controller 46 to generate a data transfer request from another data source to fill a line of instruction cache 64 with data including program instructions stored at the address generating the cache miss. Similarly, a data cache miss on a data read preferably causes data memory controller 48 to generate a data transfer request to retrieve data to fill a line in data cache/random access memory 88 with corresponding data. These instruction and data are stored in a higher level of memory. This higher level of memory may be an on-chip combined cache used by all digital signal processor cores 44 or it may be external to the multiprocessor integrated circuit. There are two alternatives for data cache misses on data writes. In a write through mode, a data write by digital processor core 44 that misses data cache/random access memory 88 causes data memory controller 48 to generate a data transfer request to store the write data in the appropriate location in a higher level of memory. In a writeback mode, a data write by digital processor core 44 that misses data cache/random access memory 88 causes data memory controller 48 to generate a data transfer request to recall corresponding data in the appropriate location from a higher level of memory for storage in data cache/random access memory 88. The write data is then written into data cache/random access memory 88 overwriting the corresponding data just recalled from the higher level of memory. This process is referred to as write allocation within the data cache.

Data memory controller 48 preferably also employs a data transfer request to handle data writeback to a higher level memory upon cache eviction of a dirty entry. A dirty cache entry includes data that has been modified since it was recalled from a higher level of memory. This modified data corresponds to a later state of the program than the data stored in the higher level of memory. When such data must be replaced to make room for new cache data, referred to as cache eviction, this dirty data must be written back to the higher level of memory to maintain the proper program state. Transfer controller with hub and ports 220 is preferably employed for this writeback of evicted dirty cache entries.

Note that the foregoing description assumes a one cycle latency for reads or writes into the memory attached to the internal memory port nodes. Single cycle read/write latency is not required for proper operation of the loop. Advantageous fixed read latency is achieved so long as the delay in each internal memory port node is the same. Such fixed read latency is desirable to enable a straightforward implementation of data tagging. Read data is always received in a fixed number of cycles following the read command. The loop structure guarantees against read data collision because the read data is received from respective addressed nodes in the same order as the read commands. Note further that a write command to any particular internal memory port node have the same latency as a read command to that node. Thus if internal memory port node master 300 issues a read/write command pair or a write/read command pair to the same address the returned read data is always proper. The loop insures that the respective read and write command reach each node in the order issued, thus the proper read data is returned. Thus all the advantages of this invention flow from a fixed interval at each node regardless of whether it is one or more clock cycles.

Significant utility results even if the delay at each internal memory port node is nonuniform or variable. Because the read command and the read data must follow the entire loop, read data is always returned to internal memory port node master 300 in the same order as it issues read commands. Each node need only handle commands in the order received without allowing a later command to cross an earlier command. Thus while the latency may be variable, the order of returned read data remains fixed even for nonuniform or variable delay at the nodes. Because the same path is used for read commands and write commands to any node, read and write commands to the same node arrive in the order issued by internal memory port node master 300. Thus internal memory port node master 300 need take no precautions for proper data return for read/write command pair or a write/read command pair to the same address. These features are not dependent upon critical timing but flow from the nature of the loop structure.

What is claimed is:

1. A method of data transfer among a plurality of nodes comprising the steps of:

initializing transfer operations from a master node, said initializing including generating a read command including an indication of one of the plurality of nodes and a memory address;

disposing the plurality of nodes in closed loop having a first node and a last node;

passing a received read command including said indication of one of the plurality of nodes and said memory address from each node to a next node in said closed loop, the first node of the plurality of nodes receiving said read command generated by the master node; and determining at each node whether a read command including said indication of one of the plurality of nodes and said memory address received from a prior node includes an indication of one of the plurality of nodes corresponding to that node, if so reading data from a memory at an address corresponding to said memory address of said read command and passing said read data to said next node in said closed loop, the last node of said plurality of nodes passing said read data to the master node.

2. The method of claim 1, wherein:

said step of generating a read command including an indication of one of the plurality of nodes generates a node number;

said method further includes assigning a unique node number to each of said plurality of nodes; and said step of determining whether a read command includes an indication of one of the plurality of nodes corresponding to that node includes determining if said node number of said read command corresponds to said node number assigned to that node.

3. The method of claim 1, wherein:

said step of generating a read command including an indication of one of the plurality of nodes generates a memory address within a unified address space;

said method further includes assigning a unique subset of said unified address space to each of said plurality of nodes; and said step of determining whether a read command includes an indication of one of the plurality of nodes corresponding to that node includes determining if said memory address of said read command corresponds to said unique subset of said unified address space assigned to that node.

4. The method of claim 1, further comprising:

said step of initializing transfer operations from said master node includes supplying to said first node constant read data along with said read command.

5. The method of claim 1, wherein:

discarding at said last node said read command including said indication of one of said plurality of nodes and said memory address following determining at said last node whether said read command includes an indication of one of the plurality of nodes corresponding to the last node and if so reading data from a memory at an address corresponding to said memory address of said read command and passing said read data to said master node.

6. The method of claim 1 further comprising the steps of:

said step of initializing transfer operations from the master node further includes generating a write command including an indication of one of the plurality of nodes, write data and a memory address; and determining at each node whether a write command including said indication of one of the plurality of nodes, said write data and said memory address received from a prior node includes an indication of one of the plurality of nodes corresponding to that node, if so writing the write data of said write command to a memory at an address corresponding to said memory address of said write command and passing said write command to said next node in said closed loop.

7. The method of claim 3, wherein:

said step of assigning a unique subset of said unified address space to each of said plurality of nodes includes assigning a unique coding of a predetermined number of most significant bits of said memory address; and said step of determining whether a read command includes an indication of one of the plurality of nodes corresponding to that node includes determining if said predetermined number of most significant bits of said memory address of said read command corresponds to said unique coding assigned to that node.

8. The method of claim 3, wherein:

said step of assigning a unique subset of said unified address space to each of said plurality of nodes includes assigning a unique address range of said memory address; and said step of determining whether a read command includes an indication of one of the plurality of nodes corresponding to that node includes determining if memory address of said read command is included within said unique address range assigned to that node.

9. The method of claim 4, wherein:

said step of supplying said first node constant read data supplies read data consisting of all 1's.

10. The method of claim 4, wherein:

said step of supplying said first node constant read data supplies read data consisting of all 0's.

11. The method of claim 6, further comprising:

discarding at said last node said write command including said indication of one of said plurality of nodes, said write data and said memory address following determining at said last node whether said write command includes an indication of one of the plurality of nodes corresponding to the last node and if so writing the write data of said write command to a memory at an address corresponding to said memory address of said write command.

12. A data processing apparatus comprising:

a plurality of memory nodes disposed in a closed loop having a first memory node and a last memory node;

a master node capable of initializing data transfer operations by generation of a read command including a memory address;

each of said plurality of memory nodes having a memory having an address input and a data output, said memory outputting data stored therein at addressed memory locations corresponding to an address received at said address input, a command input for receiving a read command from a prior memory node in said closed loop, said first memory node receiving said read command generated by said master node;

a command output for supplying received read command to a next memory node in said closed loop, said command output of said last memory node not connected, a read data input for receiving read data from a prior memory node in said closed loop, a read data output for supplying read data to a next memory node in said closed loop, said last memory node supplying read data to said master node, an address comparator generating a match signal upon detection that a received read command includes an address corresponding to a unique address range assigned to said memory node, a multiplexor having a first input connected to said read data input, a second input connected to said data output of said memory and an output connected to said read data output, said multiplexor selectively connecting either said first input or said second input to said output, and a command decoder connected to said memory, said address comparator, and said multiplexor, said command decoder supplying said received address to said address input of said memory and controlling said multiplexor to connect said second input to said output responsive to a received read command upon receipt of said match signal.

13. The data processing apparatus of claim 12, wherein:

said address comparator detects whether said read command includes a memory address having a predetermined number of most significant bits corresponding to a unique coding assigned to that memory node.

14. The data processing apparatus of claim 12, wherein:

each of said plurality of memory nodes further includes an address range block defining a unique address range within a unified address space; and said address comparator is connected to said corresponding address range block and detects whether said read command includes a memory address included within said unique address range of said address range block.

15. The data processing apparatus of claim 12, further comprising:

a constant read data source connected to said read data input of said first memory node supplying predetermined constant read data.

16. The data processing apparatus of claim 12, wherein:

said command output of said last memory node is unconnected.

17. The data processing apparatus of claim 12 wherein:

said master node further capable of initializing data transfer operations by generation of a write command including an indication of one of the plurality of memory nodes, write data and a memory address;

each memory node wherein
said memory further having a data input, said memory writing data therein to addressed memory locations corresponding to an address received at said address input,
said command input further receiving write data from a prior memory node in said closed loop, said first memory node receiving said write data generated by said master node, and
said command output further supplying said received write data to a next memory node in said closed loop;

said command decoder supplying said received address to said address input of said memory and supplying said write data to a data input of said memory responsive to a received write command upon receipt of said match signal.

18. The data processing apparatus of claim 12, wherein:

each of said memory nodes further includes a data processor.

19. The data processing apparatus of claim 15, wherein:

said constant read data source supplies said predetermined constant read data consisting of all 1's.

20. The data processing apparatus of claim 15, wherein:

said constant read data source supplies said predetermined constant read data consisting of all 0's.

21. The data processing apparatus of claim 17, wherein:

said write data of said command output of said last memory node is unconnected.

22. A method of data transfer among a plurality of nodes comprising the steps of:

initializing transfer operations from a master node, said initializing including generating a write command including an indication of one of the plurality of nodes, write data and a memory address;

disposing the plurality of nodes in closed loop having a first node and a last node;

passing a received write command including said indication of one of the plurality of nodes, said write data and said memory address from each node to a next node in said closed loop, the first node of the plurality of nodes receiving said write command generated by the master node; and determining at each node whether a write command received from a prior node includes an indication of one of the plurality of nodes corresponding to that node, if so writing said write data of said write command to a memory at an address corresponding to said memory address of said write command and passing said write command including said indication of one of the plurality of nodes, said write data and said memory address to said next node in said closed loop.

23. The method of claim 22, further comprising:

discarding at said last node said write command including said indication of one of said plurality of nodes, said write data and said memory address following determining at said last node whether said write command includes an indication of one of the plurality of nodes corresponding to the last node and if so writing said write data of said write command to a memory at an address corresponding to said memory address of said write command.

24. The method of claim 22, wherein:

said step of generating a write command including an indication of one of the plurality of nodes generates a node number;

said method further includes assigning a unique node number to each of said plurality of nodes; and said step of determining whether a write command includes an indication of one of the plurality of nodes corresponding to that node includes determining if said node number of said write command corresponds to said node number assigned to that node.

25. The method of claim 22, wherein:

said step of generating a write command including an indication of one of the plurality of nodes generates a memory address within a unified address space;

said method further includes assigning a unique subset of said unified address space to each of said plurality of nodes; and said step of determining whether a write command includes an indication of one of the plurality of nodes corresponding to that node includes determining if said memory address of said write command corresponds to said unique subset of said unified address space assigned to that node.

26. The method of claim 25, wherein:

said step of assigning a unique subset of said unified address space to each of said plurality of nodes includes assigning a unique coding of a predetermined number of most significant bits of said memory address; and said step of determining whether a write command includes an indication of one of the plurality of nodes corresponding to that node includes determining if said predetermined number of most significant bits of said memory address of said write command corresponds to said unique coding assigned to that node.

27. The method of claim 25, wherein:

said step of assigning a unique subset of said unified address space to each of said plurality of nodes includes assigning a unique address range of said memory address; and said step of determining whether a write command includes an indication of one of the plurality of nodes corresponding to that node includes determining if memory address of said write command is included within said unique address range assigned to that node.

28. A data processing apparatus comprising:

a plurality of memory nodes disposed in a closed loop having a first memory node and a last memory node;

a master node capable of initializing data transfer operations by generation of a read command including an indication of one of said plurality of memory nodes and a memory address;

each of said plurality of memory nodes having an address input for receiving said memory address from a prior memory node in said closed loop, said first memory node receiving said memory address generated by said master node;

an address output for supplying said received memory address to a next memory node in said closed loop, said address output of said last memory node not connected, a memory having an address input and a data output, said memory outputting data stored therein at addressed memory locations corresponding to an address received at said address input, a command input for receiving a read command from a prior memory node in said closed loop, said first memory node receiving said read command generated by said master node;

a command output for supplying received read command to a next memory node in said closed loop, said command output of said last memory node not connected, a read data input for receiving read data from a prior memory node in said closed loop, a read data output for supplying read data to a next memory node in said closed loop, said last memory node supplying read data to said master node, a node decoder generating a match signal upon detection that a received read command includes an indication of one of said plurality of memory modes corresponding to said memory node, a multiplexor having a first input connected to said read data input, a second input connected to said data output of said memory and an output connected to said read data output, said multiplexor selectively connecting either said first input or said second input to said output, and a command decoder connected to said memory, said node decoder, and said multiplexor, said command decoder supplying said received address to said address input of said memory and controlling said multiplexor to connect said second input to said output responsive to a received read command upon receipt of said match signal.

29. The data processing apparatus of claim 28, wherein:

each read command includes an indication of one of the plurality of memory nodes by a node number; and said node decoder detects whether said node number of said received read command corresponds to a unique node number assigned to that memory node.

30. The data processing apparatus of claim 28, wherein:

each of said plurality of memory nodes store data at memory locations within a unified address space; and said node decoder detects whether said read command includes a memory address within a unique subset of said unified address space assigned to that memory node.

31. The data processing apparatus of claim 30, wherein:

said node decoder detects whether said read command includes a memory address having a predetermined number of most significant bits corresponding to a unique coding assigned to that memory node.

32. The data processing apparatus of claim 30, wherein:

each of said plurality of memory nodes further includes an address range block defining a unique address range within said unified address space; and said node decoder is connected to said corresponding address range block and detects whether said read command includes a memory address included within said unique address range of said address range block.

33. The data processing apparatus of claim 28, further comprising:

a constant read data source connected to said read data input of said first memory node supplying predetermined constant read data.

34. The data processing apparatus of claim 33, wherein:

said constant read data source supplies said predetermined constant read data consisting of all 1's.

35. The data processing apparatus of claim 33, wherein:

said constant read data source supplies said predetermined constant read data consisting of all 0's.

36. The data processing apparatus of claim 28, wherein:

said command output of said last memory node is unconnected.

37. The data processing apparatus of claim 28, wherein:

said master node further capable of initializing data transfer operations by generation of a write command including an indication of one of the plurality of memory nodes, write data and a memory address;

each memory node wherein said memory further having a data input, said memory writing data therein to addressed memory locations corresponding to an address received at said address input, said command input further receiving write data from a prior memory node in said closed loop, said first memory node receiving said write data generated by said master node, and said command output further supplying said received write data to a next memory node in said closed loop;

said command decoder supplying said received address to said address input of said memory and supplying said write data to a data input of said memory responsive to a received write command upon receipt of said match signal.

38. The data processing apparatus of claim 37, wherein:

said write data of said command output of said last memory node is unconnected.

39. The data processing apparatus of claim 28, wherein:

each of said memory nodes further includes a data processor.

40. A data processing apparatus comprising:
a plurality of memory nodes disposed in a closed loop having a first memory node and a last memory node;
a master node capable of initializing data transfer operations by generation of a write command including an indication of one of said plurality of memory nodes, write data and a memory address;
each of said plurality of memory nodes having
   an address input for receiving said memory address from a prior memory node in said closed loop, said first memory node receiving said memory address generated by said master node;
   an address output for supplying said received memory address to a next memory node in said closed loop, said address output of said last memory node not connected,
   a memory having an address input and a data input, said memory writing data therein to addressed memory locations corresponding to an address received at said address input,
   a command input for receiving a write command from a prior memory node in said closed loop, said first memory node receiving said write command generated by said master node;
   a command output for supplying received write command to a next memory node in said closed loop, said command output of said last memory node not connected,
   a write data input for receiving write data from a prior memory node in said closed loop,
   a write data output for supplying write data to a next memory node in said closed loop,
   a node decoder generating a match signal upon detection that a received write command includes an indication of said memory node, and
   a command decoder connected to said memory and said node decoder, said command decoder supplying said received address to said address input of said memory and supplying said write data to said data input of said memory responsive to a received write command upon receipt of said match signal.

41. The data processing apparatus of claim 40, wherein:
said write data output of said command output of said last memory node is unconnected.

42. The data processing apparatus of claim 40, wherein:
each write command includes an indication of one of the plurality of memory nodes by a node number; and
said node decoder detects whether said node number of said received write command corresponds to a unique node number assigned to that memory node.

43. The data processing apparatus of claim 40, wherein:
each of said plurality of memory nodes store data at memory locations within a unified address space; and
said node decoder detects whether said write command includes a memory address within a unique subset of said unified address space assigned to that memory node.

44. The data processing apparatus of claim 43, wherein:
said node decoder detects whether said write command includes a memory address having a predetermined number of most significant bits corresponding to a unique coding assigned to that memory node.

45. The data processing apparatus of claim 43, wherein:
each of said plurality of memory nodes further includes an address range block defining a unique address range within said unified address space; and
said node decoder is connected to said corresponding address range block and detects whether said write command includes a memory address included within said unique address range of said address range block.

46. The data processing apparatus of claim 40, wherein:
each of said memory nodes further includes a data processor.

* * * * *